(12) United States Patent
Yamamoto et al.

(10) Patent No.: US 6,989,415 B1
(45) Date of Patent: Jan. 24, 2006

(54) MODIFIED FLUOROPLASTIC COMPOSITION AND MODIFIED FLUOROPLASTIC MOLDED ARTICLE

(75) Inventors: Yasuaki Yamamoto, Tokyo (JP); Etsuo Fukuchi, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 10/897,021

(22) Filed: Jul. 23, 2004

(51) Int. Cl.
*C08L 79/08* (2006.01)

(52) U.S. Cl. .................. 524/420; 524/514; 525/180
(58) Field of Classification Search ................ 525/180; 524/514, 420
See application file for complete search history.

(56) References Cited

U.S. PATENT DOCUMENTS 6,465,575 B1   10/2002   Kusano et al.

FOREIGN PATENT DOCUMENTS

| JP | 2000-129019 A | 5/2000 |
| JP | 2004-10717 | * 1/2004 |

* cited by examiner

*Primary Examiner*—Ana Woodward
(74) *Attorney, Agent, or Firm*—Foley & Lardner LLP

(57) ABSTRACT

A modified fluoroplastic composition contains a first unmodified fluoroplastic prepared by applying ionizing radiation to the fluoroplastic heated at the melting point or a higher temperature under an inert gas atmosphere, a second unmodified fluoroplastic, and a polyamide-imide resin.

23 Claims, No Drawings

MODIFIED FLUOROPLASTIC COMPOSITION AND MODIFIED FLUOROPLASTIC MOLDED ARTICLE

The present application is based on Japanese patent application No. 2003-129491, the entire contents of which are incorporated herein by reference.

BACKGROUND OF THE INVENTION

1. Field of the Invention

The present invention relates to a modified fluoroplastic composition having excellent abrasion resistance and creep resistance, and which can be used for sliding parts, seal articles, packing, and gaskets as well as a container, a jig, piping and the like for manufacturing semiconductors, and the molded articles prepared from such modified fluoroplastic composition.

2. Description of the Related Art

Fluoroplastic has low fiction properties and is excellent in heat resistance, electric properties, chemical resistance, and non-contamination properties (non-staining properties), so that such fluoroplastic is widely used in a variety of industrial and household applications. On the other hand, fluoroplastic exhibits remarkable abrasion and significant creep deformation under a sliding environment or a compression environment at a high-temperature, and thus, there was a case where fluoroplastic could not been applied.

As a countermeasure for such disadvantage, a filler such as a glass fiber, and a carbon fiber is added to fluoroplastic, whereby properties of abrasion and creep deformation are improved.

According to the manner as mentioned above, however, there is a problem that such a reinforced fluoroplastic damages parts made from a soft metal such as aluminum wherein the parts are in a sliding condition with respect to a molded article made from the reinforced fluoroplastic. For eliminating the disadvantage, a variety of fillers is studied.

An example for a filler which does not damage parts being in a sliding condition with the reinforced fluoroplastic includes polyimide resin, aromatic polyester resins and the like. However, even ifsucha filler is added to fluoroplastic, sufficient abrasion resistance and creep resistance are not necessarily obtained under a severe sliding environment such as a high-speed or a high-load environment, or an environment in the case where parts to be in a sliding state with respect to the resulting fluoroplastic product has a remarkable surface roughness.

On one hand, there is a modified fluoroplastic disclosed in Japanese patent application laid-open No. 2000-129019 which is intended to obtain a sliding member having excellent abrasion resistance by a manner for modifying fluoroplastic itself without adding any filler.

Even in the modified fluoroplastic, sufficient abrasion resistance and creep resistance are not achieved under a severe sliding environment.

SUMARY OF THE INVENTION

Accordingly, an object of the present invention is to provide a modified fluoroplastic composition from which a member having excellent abrasion resistance and creep resistance is prepared even under a severe sliding environment, beside the member which does not damage parts to be in a sliding state therewith, and good properties inherent to fluoroplastic are also realized by the modified fluoroplastic composition, and to provide molded articles obtained from the modified fluoroplastic composition.

In order to achieve the above-described object, a modified fluoroplastic composition according to the present invention comprises a modified fluoroplastic prepared by applying ionizing radiation to a first unmodified fluoroplastic heated at the melting point or a higher temperature under an inert gas atmosphere, a second unmodified fluoroplastic, and a polyamide-imide resin.

In the modified fluoroplastic composition according to the present invention, a weight of the modified fluoroplastic is 5 parts by weight to 50 parts by weight of the overall weight of the modified fluoroplastic composition, a weight of the polyamide-imide resin is 5 parts by weight to 20 parts by weight of the overall weight of the modified fluoroplastic composition, and a sum weight of the modified fluoroplastic and the polyamide-imide resin is 10 parts by weight to 60 parts by weight of the overall weight of the modified fluoroplastic composition.

In the modified fluoroplastic composition according to the present invention, the first unmodified fluoroplastic is at least one member selected from the group consisting of tetrafluoroethylene-based polymers, tetrafluoroethylene-perfluoro(alkyl vinyl ether)-based copolymers, and tetrafluoroethylene-hexafluoropropylene-based copolymers.

In the modified fluoroplastic composition according to the present invention, the second unmodified fluoroplastic is at least one member selected from the group consisting of tetrafluoroethylene-based polymers, tetrafluoroethylene-perfluoro(alkyl vinyl ether)-based copolymers, and tetrafluoroethylene-hexafluoropropylene-based copolymers.

In the modified fluoroplastic composition according to the present invention, any of the tetrafluoroethylene-based polymers contains 0.2 mol % or less of a polymeric unit derived from a copolymerizable monomer selected from the group consisting of perfluoro(alkyl vinyl ether), hexafluoropropylene, (perfluorolakyl)ethylene, and chlorotrifluoroethylene.

In the modified fluoroplastic composition according to the present invention, the first or second unmodified fluoroplastic is a tetrafluoroethylene-based polymer, and 1 mol % or less of a heterogeneous fluoromonomer is contained further.

In the modified fluoroplastic composition according to the present invention, the modified fluoroplastic has 40 J/g or less heat of crystallization, and 325° C. or less melting point.

In the modified fluoroplastic composition according to the present invention, the modified fluoroplastic is prepared by applying ionizing radiation to a first unmodified fluoroplastic heated at the melting point or a higher temperature under an inert gas atmosphere having a 10 torr or less oxygen concentration within a range of irradiation doses of from 1 KGy to 10 MGy.

In the modified fluoroplastic composition according to the present invention, the higher temperature ranges from 10 to 30° C. than that of the melting point.

In the modified fluoroplastic composition according to the present invention, the fluoroplastic is a tetrafluoroethylene-based polymer heated at a temperature ranging from 327° C. to 357° C.

In the modified fluoroplastic composition according to the present invention, the fluoroplastic is a tetrafluoroethylene-perfluoro(alkyl vinyl ether)-based copolymer heated at a temperature ranging from 310° C. to 340° C.

In the modified fluoroplastic composition according to the present invention, the fluoroplastic is a tetrafluoroethylene-hexafluoropropylene-based copolymer heated at a temperature ranging from 275° C. to 305° C.

A modified fluoroplastic molded article according to the present invention comprises a modified fluoroplastic composition molded into a predetermined shape, the modified fluoroplastic composition comprising a modified fluoroplastic prepared by applying ionizing radiation to a first unmodified fluoroplastic heated at the melting point or a higher temperature under an inert gas atmosphere, a second unmodified fluoroplastic, and a polyamide-imide resin.

In the modified fluoroplastic composition according to the present invention, the modified fluoroplastic composition contains further a solid lubricant selected from the group consisting of molybdenum disulfide, and graphite.

DESCRIPTION OF THE PREFERRED EMBODIMENTS

Preferred embodiments of the present invention will be described in detail hereinafter.

An example of first unmodified fluoroplastics which are used for modification thereof and second unmodified fluoroplastics which have not yet been modified includes tetrafluoroethylene-based polymers (hereinafter referred to as "PTFE"), tetrafluoroethylene-fluoroalkoxytrifluoropropylene copolymer (hereinafter referred to as "PFA"), tetrafluoroethylene-hexafluoropropylene copolymer (hereinafter referred to as "FEP"), and polytetrafluoroethylene-perfluorodioxythol (hereinafter referred to as "THF/PDD").

The above-described PTFE includes also those containing 0.2 mol % or less of a polymeric unit derived from a copolymerizable monomer such as perfluoro (alkyl vinyl ether), hexafluoropropylene, (perfluorolakyl)ethylene, and chlorotrifluoroethylene. Furthermore, the fluoroplastics in the above-described copolymeric form may contain a small amount of a third component in their molecular structures.

It is desired that modified fluoroplastics used in the present invention have a melting point of 325° C. or less and a heat of crystallization of 40 J/g or less. In a treating condition, when the values in properties of these fluoroplastics exceed those described above, the abrasion resistance and creep resistance thereof decrease remarkably. In the case where a fluoroplastic is PFA, it is preferred that a melting point of the PFA is 305° C. or less, and a heat of crystallization is 26 J/g or less. In the case where a fluoroplastic is FEP, it is preferred that a melting point of the FEP is 275° C. or less, and a heat of crystallization is 11 J/g or less.

For estimating the above-described thermal properties, a Differential Scanning Calorimeter (DSC) is used. Temperature rise and temperature descent of a fluoroplastic are repeated two times, respectively, per 10° C./min. within a range of from 50 to 360° C. to determine an endothermic peak temperature of a DSC curve in a second temperature rise as a melting point. Furthermore, a heat of crystallization is determined from a peak area surrounded by the exothermic peak in a second temperature descent and a base line in accordance with JIS K7122.

Modified fluoroplastics used in the present invention may be prepared by applying ionizing radiation to a first unmodified fluoroplastic which is in a state wherein it is heated at the melting temperature or a higher temperature under an inert gas atmosphere having 10 torr or less oxygen concentration within a range of an irradiation doses of from 1 KGy to 10 MGy.

In the present invention, an example of the ionizing radiation to be used includes γ rays, electron rays, X rays, neutron radiation and high-energy ions.

In case of applying ionizing radiation, it is necessary for heating a first unmodified fluoroplastic at its crystalline melting point or a higher temperature. For instance, when a PTFE is used as a fluoroplastic material, it is required to expose ionizing radiation to the fluoroplastic material which is under a heating condition at a higher temperature than 327° C. being the melting point of the fluoroplastic material. In case of employing a PFA or an FEP, it is required to expose such a material to ionizing radiation under a heating condition wherein the former PFA is heated at its melting point of 310° C. or a higher temperature, while the latter FEP is heated at its melting point of 275° C. or a higher temperature.

To heat a fluoroplastic at its melting point or a higher temperature means to activate molecular motion of backbone chains which constitute the fluoroplastic, whereby it becomes possible to efficiently accelerate crosslinking reactions among molecules. However, excessive heating brings about adversely cutting and decomposition of the molecular backbone chains. Accordingly, a heating temperature should be limited to a range wherein it is 10 to 30° C. higher than a melting point of fluoroplastics in view of suppressing an occurrence of such a depolymerizing phenomenon.

Furthermore, a modified fluoroplastic molded article according to the present invention may be obtained by such a manner that a metal mold having a predetermined profile is filled with the above-mentioned modified fluoroplastic composition, and molded under a predetermined pressure.

According to the modified fluoroplastic molded articles, a wide variety of applications for sliding members such as a nonlubricated bearing, a dynamic seal, rolls for copying machine and a bearing pad, and semiconductor-related manufactured parts is expected. Besides, it is possible to elevate lubricity by adding molybdenum disulfide, graphite or the like to the modified fluoroplastic composition of the present invention in compliance with its application.

EXAMPLES

In the following, the present invention is specifically described and advantageous effects of the invention are also demonstrated on the basis of a comparison of the present examples with comparative examples.

PTFE powder (Trade Name: P-192 manufactured byAsahi Glass Co., Ltd.) was used as a first unmodified fluoroplastic and a second unmodified fluoroplastic, while a polyamide-imide powder (Trade Name: Torlon 4000TF manufactured by Amoco Co.) was used as a polyamide-imide resin. Moreover, carbon fiber (Trade Name: Kreca Chop M-2007S manufactured by Kureha Chemical IndustryCo., Ltd.), molybdenumdisulfide (TradeName: Molykote Z manufactured by Dow Corning Co., Ltd.), and graphite (Trade Name: TIMREX KS6 manufactured by TIMCAL Co., Ltd.) were used as the other additives.

Modification of a fluoroplastic was made as follows. The above-described PTFE was exposed to electron beam (2 MeV acceleration voltage) of an irradiation dose of 100 KGy at a heating temperature of 340° C. in 1 torr oxygen concentration under nitrogen atmosphere. The resulting modified fluoroplastic powder was pulverized in a jet mill until an average particle diameter thereof reached about 20 μm.

These materials were blended with a mixer at a material temperature and an environmental temperature of 15° C. in formulation compositions indicated in the following Table 1. A metal mold having 45 mm diameter and 80 mm height was charged with each of the resulting compounds, and pressed for five minutes under 50 MPa to compression-mold the compound. Then, the resulting product in all the examples and comparative examples was taken out from the metal mold, and calcined at 360° C. for two hours under the atmosphere other than example 4, comparative example 3, and comparative example 4 wherein a total weight of the modified PTFE and the polyamide-polyimide resin is 30 parts by weight or more. In these example 4, comparative examples 3 and 4, each of the resulting compounds was compression-molded at normal temperature, calcination was followed at 360° C. for two hours at the atmospheric pressure. Thereafter, the resulting product contained in a metal mold was taken out at normal temperature, and compression-molded under a molding pressure of 20 MPa to prepare a rod. The rods thus prepared were cut out with a predetermined length to obtain test pieces.

TABLE 1

Formulation Composition (weight parts)

|  | Example | | | | Comparative Example | | | | |
| --- | --- | --- | --- | --- | --- | --- | --- | --- | --- |
| Composition | 1 | 2 | 3 | 4 | 1 | 2 | 3 | 4 | 5 |
| PTEF | 82 | 77 | 80 | 68 | 77 | 82 | 57 | 57 | 77 |
| Modified PTFE | 10 | 10 | 15 | 20 | 20 |  | 43 | 10 | 10 |
| Polyamide-imide Resin | 5 | 10 | 5 | 10 |  | 15 |  | 30 |  |
| Molybdenum Disulfide | 3 | 3 |  |  | 3 | 3 |  | 3 | 3 |
| Graphite |  |  |  | 2 |  |  |  |  |  |
| Carbon Fiber |  |  |  |  |  |  |  |  | 10 |

Next, evaluations on characteristic properties of samples will be described. Tests were conducted three times per a sample, and an average value was determined by arithmetical mean from the results measured of the samples.

(1) Tensile Properties

A test was applied based on JIS K7161, and the test was conducted with the use of a test specimen having 0.5 mm thickness at 200 mm/min. tensile test rate.

(2) Abrasion Resistance Properties

A thrust type friction and abrasion testing machine was used for tests based on JIS K7218 wherein a test specimen (25.6 mm outer diameter, 20.6 mm inner diameter, and 1 mm thickness) was bonded to a cylindrical ring (25.6 mm outer diameter, and 20.6 mm inner diameter) made of SUS 304. The tests were conducted with the use of a member to be frictionized with a test specimen wherein the member is an ADC 12 plate (30 mm length, 30 mm width, 5 mm thickness, and 0.4 μm surface roughness Ra) at a rate of 50 m/min. under a pressure of 1 MPa. After the lapse of twenty-four hours, decrease in a weight of a test specimen was measured, and a comparative abrasion quantity was determined from the following formula:

$$V_{SA} = V/(P.L)$$

wherein V is abrasion quantity, P is test load, and L is average sliding distance.

Furthermore, damages in a member to be frictionized with a test specimen were determined from weight changes before and after its abrasion test.

The resulting properties (tensile properties, and abrasion resistance properties) are shown in the following table 2.

From the above-described results, it was understood that all the molded articles prepared from a composition containing a modified PTFE and polyamide-imide resin as the major components according to the present examples exhibited good tensile properties and excellent abrasion resistance properties. Furthermore, an aluminum material being a member frictionized with a test specimen was not damaged after applying abrasion test, because a weight of the member increases due to formation of a film transferred onto the aluminum material from materials contained in the above-described composition.

On the other hand, all the molded articles obtained in comparative examples 1 through 4 exhibited poor abrasion resistances under a condition of a high pressure upon its plane of the resulting molded article. Particularly, in comparative example 4 wherein a large amount of polyamide-imide resin was added, a weight of a member frictionized with the test specimen decreased, so that the member was damaged. Moreover, the test specimen to which a filler other than polyamide-imide resin was added in comparative example 5 scraped a member frictionized with the test specimen, so that it was damaged.

As is apparent from the comparison of the above-described examples with comparative examples, the molded articles according to the present examples exhibit excellent tensile properties and abrasion resistance properties, besides they may suppress damages with respect to soft metals such as aluminum, so that the modified fluoroplastic composition can contribute remarkably to improve a modified fluoroplastic molded article in view of broadening an applicable range thereof.

Since the modified fluoroplastic composition according to the present invention contains polyamide-imide resin in addition to the modified fluoroplastic, it becomes possible to achieve excellent abrasion resistance and creep resistance even under a severe environment without damaging a member frictionized with a molded article prepared from the modified fluoroplastic composition according to the present invention.

In this connection, the above-described good abrasion resistance and creep resistance can be realized, besides good properties inherent to fluoroplastic are not impaired by such arrangement that a weight of the above-described modified fluoroplastic is 5 parts by weigh to 50 parts by weight of the

TABLE 2

| | | Results of Properties | | | | | | | | |
| --- | --- | --- | --- | --- | --- | --- | --- | --- | --- | --- |
| | | Example | | | | Comparative Example | | | | |
| Properties | | 1 | 2 | 3 | 4 | 1 | 2 | 3 | 4 | 5 |
| Tensile Properties | Tensile Strength (MPa) | 16.8 | 13.4 | 14.6 | 12.5 | 21.8 | 25.3 | 15.1 | 11.2 | 12.6 |
| | Elongation (%) | 360 | 280 | 370 | 250 | 390 | 350 | 340 | 160 | 120 |
| Abrasion Resistance Properties | Comparative Abrasion Quantity ($\times 10^{-8}$ mm$^3$/Nm) | 60 | 25 | 18 | 10 | 3500 | 7300 | 2300 | 9600 | 1900 |
| | Coefficient of Friction | 0.20 | 0.18 | 0.25 | 0.20 | 0.26 | 0.34 | 0.30 | 0.36 | 0.27 |
| | Damages in Member to be fractionized with Test Specimen | No | No | No | No | No | No | No | Yes | Yes |
| | Weight Changes in Member to be frictionized with Test Specimen (mg) | 2.8 | 3.5 | 3.6 | 3.6 | 1.8 | 0.8 | 2.0 | −1.8 | −2.2 | overall weight of the modified fluoroplastic composition, a weight of the above-described polyamide-imide resin is 5 parts by weigh to 20 parts by weight of the overall weight of the modified fluoroplastic composition, and a sum weight of the modified fluoroplastic and the polyamide-imide resin is 10 parts by weight to 60 parts by weight of the overall weight of the modified fluoroplastic composition.

Moreover, when the above-described modified fluoroplastic compositions are molded into predetermined shapes to obtain modified fluoroplastic molded articles, respectively, it becomes possible to provide sliding members such as a nonlubricated bearing, a dynamic seal, rolls for copying machine and a bearing pad, and semiconductor-related manufactured parts for a wide variety of applications.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A modified fluoroplastic composition, comprising:
    a modified fluoroplastic prepared by applying ionizing radiation to a first unmodified fluoroplastic heated at the melting point or a higher temperature under an inert gas atmosphere;
    a second unmodified fluoroplastic; and
    a polyamide-imide resin.

2. The modified fluoroplastic composition as defined in claim 1, wherein:
    the weight of the modified fluoroplastic is 5 parts by weight to 50 parts by weight of the overall weight of the modified fluoroplastic composition, the weight of the polyamide-imide resin is 5 parts by weight to 20 parts by weight of the overall weight of the modified fluoroplastic composition; and
    the sum weight of the modified fluoroplastic and the polyamide-imide resin is 10 parts by weight to 60 parts by weight of the overall weight of the modified fluoroplastic composition.

3. The modified fluoroplastic composition as defined in claim 1, wherein:
    the first or second unmodified fluoroplastic is a tetrafluoroethylene-based polymer, further comprising 1 mol % or less of a heterogeneous fluoromonomer.

4. The modified fluoroplastic composition as defined in claim 1, wherein:
    the modified fluoroplastic has 40 J/g or less heat of crystallization, and 325° C. or less melting point.

5. The modified fluoroplastic composition as defined in claim 1, wherein:
    the modified fluoroplastic is prepared by applying ionizing radiation to a first unmodified fluoroplastic heated at the melting point or a higher temperature under an inert gas atmosphere having a 10 torr or less oxygen concentration within a range of irradiation doses of from 1 KGy to 10 MGy.

6. The modified fluoroplastic composition as defined in claim 5, wherein:
    the higher temperature ranges from 10 to 30° C. above the melting point.

7. The modified fluoroplastic composition as defined in claim 6, wherein:
    the fluoroplastic is a tetrafluoroethylene-based polymer heated at a temperature ranging from 327° C. to 357° C.

8. The modified fluoroplastic composition as defined in claim 6, wherein:
    the fluoroplastic is a tetrafluoroethylene-perfluoro(alkyl vinyl ether)-based copolymer heated at a temperature ranging from 310° C. to 340° C.

9. The modified fluoroplastic composition as defined in claim 6, wherein:
    the fluoroplastic is a tetrafluoroethylene-hexafluoropropylene-based copolymer heated at a temperature ranging from 275° C. to 305° C.

10. The modified fluoroplastic composition as defined in claim 1, wherein the second unmodified fluoroplastic comprises a tetrafluoroethylene-based polymer.

11. The modified fluoroplastic composition as defined in claim 10, wherein the tetrafluoroethylene-based polymer contains 0.2 mol % or less of a polymeric unit derived from a copolymerizable monomer selected from the group consisting of perfluoro(alkyl vinyl ether), hexafluoropropylene, (perfluorolakyl)ethylene, and chlorotrifluoroethylene.

12. The modified fluoroplastic composition as defined in claim 1, wherein the first unmodified fluoroplastic comprises a tetrafluoroethylene-perfluoro(alkyl vinyl ether)-based copolymer.

13. The modified fluoroplastic composition as defined in claim 12, wherein the tetrafluoroethylene-perfluoro(alkyl vinyl ether)-based copolymer further contains 0.2 mol % or less of a polymeric unit derived from a copolymerizable monomer selected from the group consisting of, hexafluoropropylene, (perfluorolakyl)ethylene, and chlorotrifluoroethylene.

14. The modified fluoroplastic composition as defined in claim 1, wherein the first unmodified fluoroplastic comprises a tetrafluoroethylene-hexafluoropropylene-based copolymer.

15. The modified fluoroplastic composition as defined in claim 14, wherein the tetrafluoroethylene-hexafluoropropylene-based further contains 0.2 mol % or less of a polymeric unit derived from a copolymerizable monomer selected from the group consisting of perfluoro(alkyl vinyl ether), (perfluorolakyl)ethylene, and chlorotrifluoroethylene.

16. The modified fluoroplastic composition as defined in claim 1, wherein the first unmodified fluoroplastic comprises a tetrafluoroethylene-based polymer.

17. The modified fluoroplastic composition as defined in claim 16, wherein the tetrafluoroethylene-based polymer contains 0.2 mol % or less of a polymeric unit derived from a copolymerizable monomer selected from the group consisting of perfluoro(alkyl vinyl ether), hexafluoropropylene, (perfluorolakyl)ethylene, and chlorotrifluoroethylene.

18. The modified fluoroplastic composition as defined in claim 1, wherein the second unmodified fluoroplastic comprises a tetrafluoroethylene-perfluoro(alkyl vinyl ether)-based copolymer.

19. The modified fluoroplastic composition as defined in claim 18, wherein the tetrafluoroethylene-perfluoro(alkyl vinyl ether)-based copolymer further contains 0.2 mol % or less of a polymeric unit derived from a copolymerizable monomer selected from the group consisting of (perfluorolakyl)ethylene, and chlorotrifluoroethylene.

20. The modified fluoroplastic composition as defined in claim 1, wherein the second unmodified fluoroplastic comprises a tetrafluoroethylene-hexafluoropropylene-based copolymer.

21. The modified fluoroplastic composition as defined in claim 20, wherein the tetrafluoroethylene-hexafluoropropylene-based copolymer further contains 0.2 mol % or less of a polymeric unit derived from a copolymerizable monomer selected from the group consisting of perfluoro(alkyl vinyl ether), hexafluoropropylene, (perfluorolakyl)ethylene, and chlorotrifluoroethylene.

22. A modified fluoroplastic molded article, comprising:
a modified fluoroplastic composition molded into a predetermined shape; and
the modified fluoroplastic composition comprising
a modified fluoroplastic prepared by applying ionizing radiation to a first unmodified fluoroplastic heated at the melting point or a higher temperature under an inert gas atmosphere;
a second unmodified fluoroplastic; and
a polyamide-imide resin.

23. The modified fluoroplastic article as defined in claim 22, wherein:
the modified fluoroplastic composition contains further a solid lubricant selected from the group consisting of molybdenum disulfide, and graphite.

* * * * *